Nov. 19, 1968  K. F. GRUNER ETAL  3,411,538
FLUID DIVERTING VALVE
Filed April 5, 1967  3 Sheets-Sheet 1
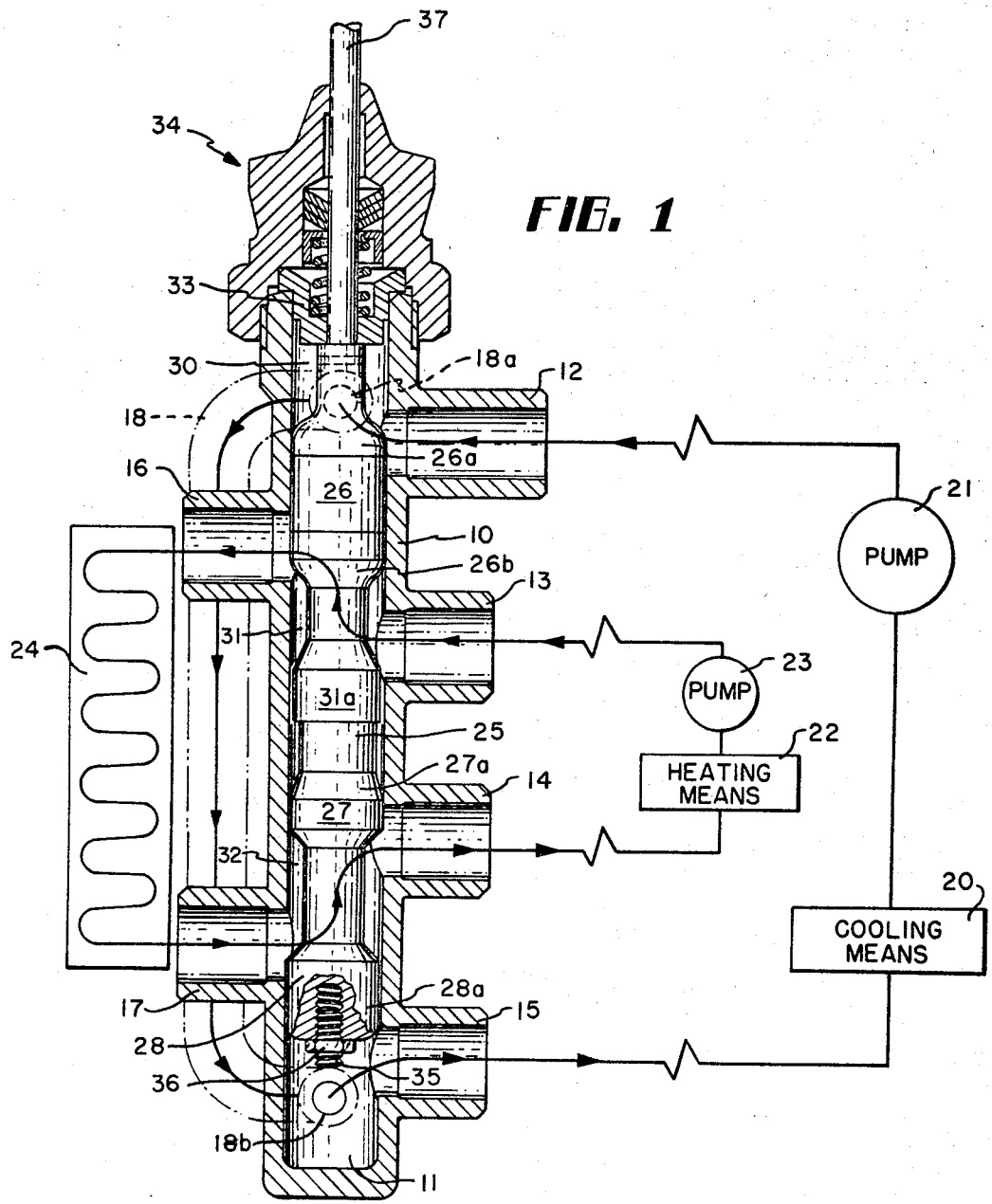
INVENTOR.
KARL F. GRUNER
HEINRICH K. LAU
BY
*Donald R. Fustrom*
ATTORNEY

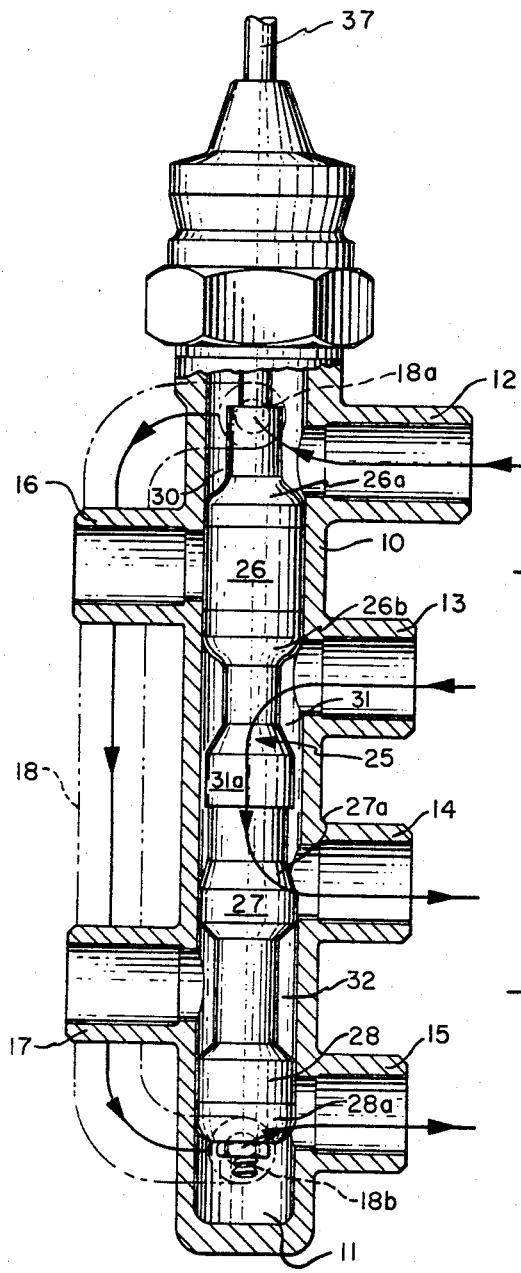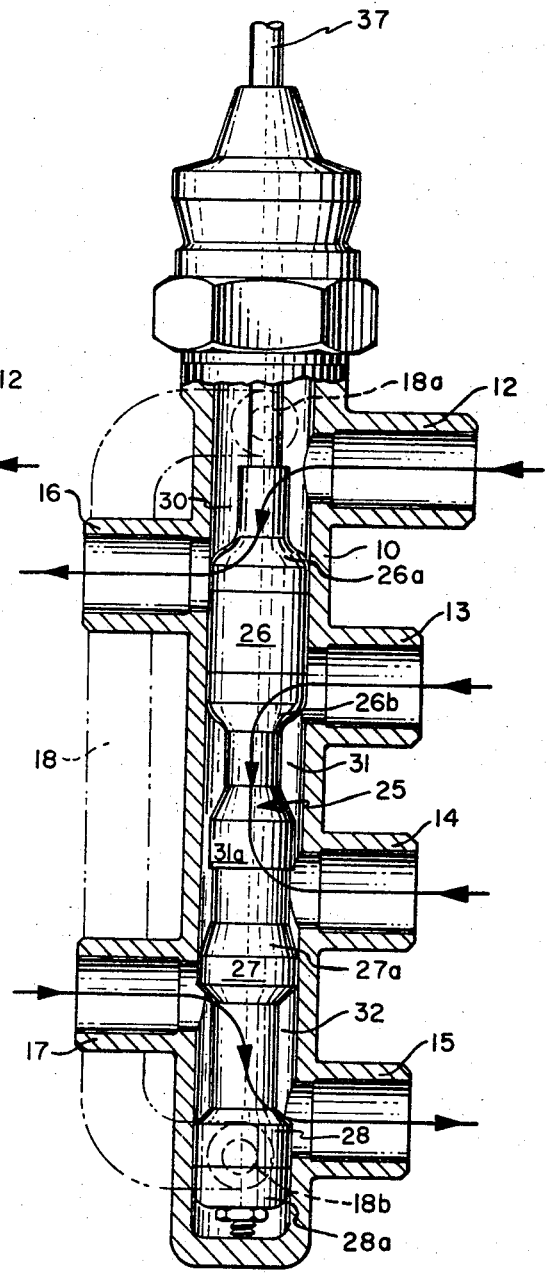

Nov. 19, 1968  K. F. GRUNER ETAL  3,411,538
FLUID DIVERTING VALVE

Filed April 5, 1967  3 Sheets-Sheet 3

INVENTOR.
KARL F. GRUNER
HEINRICH K. LAU
BY Donald R. Sjostrom
ATTORNEY

United States Patent Office 3,411,538
Patented Nov. 19, 1968

3,411,538
FLUID DIVERTING VALVE
Karl F. Gruner, Offenbach am Main, and Heinrich K. Lau, Bischofsheim am Main, Germany, assignors to Honeywell G.m.b.H., Frankfurt am Main, Germany, a corporation of Germany
Filed Apr. 5, 1967, Ser. No. 628,719
Claims priority, application Germany, Apr. 16, 1966, H 55,284, H 59,137
9 Claims. (Cl. 137—625.29)

ABSTRACT OF THE DISCLOSURE

A four-pipe temperature conditioning system including heating and cooling fluid supplies, each with its own return, and a common heat exchanger utilized for both heating and cooling, and further including a unitary six-port fluid diverting valve of the spool or slide-valve type, operable to connect the heat exchanger across either the heating fluid supply and return or the cooling fluid supply and return while simultaneously connecting the fluid supply which is not connected to the heat exchanger directly to its return, and further operable to completely interrupt fluid flow to the heat exchanger and to bypass each of the fluid supplies directly to its return.

Background of the invention

This invention relates to fluid diverting valves for controlling the flow of temperature conditioning fluid to a heat exchanger. Specifically, it relates to a unitary six-port diverting valve for use in four-pipe heating and cooling systems, and which provides a bypass arrangement so that the heating and cooling fluids are continuously circulated whether they are connected to the heat exchanger or not.

In the air conditioning of many modern buildings there are periods during which some portions of the building must be heated while other portions are being cooled. Also the demand for heating or cooling may vary rapidly as for example due to solar radiation or to the ingress or egress of a large number of people in an area. Air conditioning systems with mixed operations in which a heating medium as well as a cooling medium are held constantly ready for use are well known. Often a so-called three-pipe system with a heating fluid supply, a cooling fluid supply and a common return have been utilized. Recently the advantages of a four-pipe system wherein the heating and cooling media each has its own return, have been realized. In such systems the heating and cooling media are not mixed but one or the other is used as required. The amount of energy necessary to maintain the desired temperatures thereof is thus substantially reduced. The control of such systems has presented a number of problems. One approach has been to provide two three-way valves, one controlling heating fluid and the other the cooling fluid. The advantages of a unitary valve for controlling the flow of both fluids has been realized and several unitary valves have also been proposed. Most of these valves have provided an arrangement wherein one of the fluids is supplied to the heat exchanger and the other is simply blocked off so that it does not circulate. More recently, it has been realized that a bypass arrangement is desirable so that the fluid not being supplied to the heat exchanger is nevertheless circulated and maintained at a constant temperature so that it will be usable for its desired function immediately, should the need arise.

Valves of this type are exemplified by the disclosures in U.S. Patents 2,952,446 and 3,241,602. These prior control valves have had certain disadvantages. For example, in the first of the above noted patents, the valve failed to provide a complete bypass arrangement. In the second of the two patents a complete bypass was provided but only by the use of an extremely complex valve including an axially movable plug with complex passages formed therein. In addition, the valve body itself also included complex passages. Thus, both the valve body and the movable plug would be extremely difficult to manufacture and therefore costly.

Brief summary of the invention

The valve of this invention is simple in construction and therefore relatively easy and inexpensive to manufacture. It has no complex internal passages in the valve body or the slide valve which cooperates therewith but provides a complete bypass arrangement.

The valve of this invention includes a body with a longitudinally extending passage and connecting thereto a plurality of ports, each of which is spaced longitudinally along the body from each of the other ports. A bypass flow passage is provided between the first inlet port and the first outlet port. A slide valve is disposed in the passage and includes a plurality of spaced lands and spaces for controlling fluid flow between adjacent ones of the ports and through a bypass passage. In one extreme position of the slide valve member the cooling fluid is supplied to the heat exchanger and the heating fluid is bypassed directly to its return. In the other extreme position the heating fluid is supplied to the heat exchanger and the cooling fluid bypassed. In an intermediate position there is no flow to the heat exchanger and there is full bypass of both fluids. Between these three positions modulation with full bypass of one of the fluids and partial bypass of the other is provided.

Description of drawing

FIGURE 1 is a longitudinal cross sectional view of a six-port valve constructed according to this invention and with the slide valve member which forms a part thereof in one of its extreme positions. FIGURE 1 further discloses schematically a temperature conditioning system in which the valve is utilized.

FIGURE 2 is a generally similar view of the valve with the slide valve member disposed in an intermediate control position.

FIGURE 3 is another generally similar view with the slide valve member disposed in its other extreme position.

Detailed description

Figure 5:
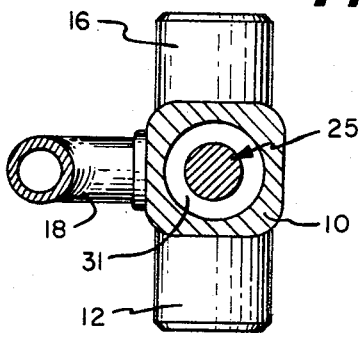
FIGURE 5 is a transverse cross sectional view of the valve taken generally along line 5—5 of FIGURE 4.
Figure 4:
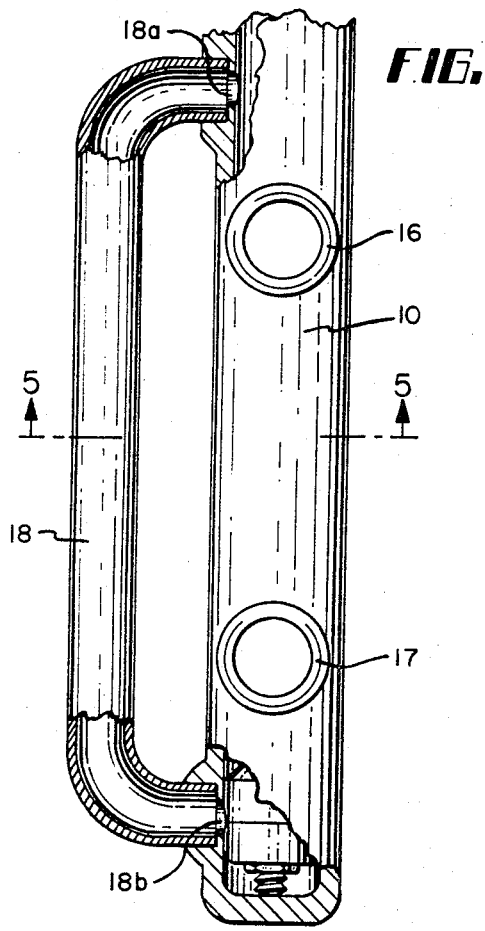
FIGURE 4 is a fragmentary view of the valve, with portions broken away, as viewed from the left hand side of FIGURE 3.

Reference will first be made to FIGURES 1 through 5 of the drawing. As seen therein, the valve includes an elongated valve body 10 having a generally cylindrical, longitudinally extending passage 11 formed therein and extending from the open upper end of body 10 and terminating at the closed lower end of body 10. The valve body includes two inlet or supply ports 12 and 13, two outlet or return ports 14 and 15, a load supply port 16 and a load return port 17. Each of these ports connects into the central passage 11 and each is adapted to be connected into a fluid circuit by being soldered or threaded to appropriate piping. These six ports are disposed so that each is longitudinally spaced from each of the other ports. The two supply ports 12 and 13 are positioned in the upper portion of the valve body with the load supply port disposed longitudinally between them. At the lower end of the valve body, return ports 14 and 15 have the load return port 17 disposed longitudinally between them. A bypass passage 18 is shown schematically in FIGURE 1. In reality this passage extends externally of the valve on the back side thereof. Passage 18 has an inlet opening 18a connnecting into passage 11 in the valve body adjacent supply port 12 and another port 18b connecting into passage 11 adjacent return port 15.

FIGURE 1 discloses schematically an example of a system in which the valve may be used. It should be understood that the system disclosed is a very simple one and that in most applications a much more complicated system utilizing a plurality of valves controlling flow to several different spaces in a building may be used. As seen in FIGURE 1, supply port 12 and return port 15 are connected in the circuit for one of the fluids, for example the cooling fluid, which circuit includes a cooling or refrigerating means 20 and a circulator or pump 21 connected together by appropriate piping. Similarly, supply port 13 and return port 14 are connected in a circuit for the heating fluid. This circuit includes a heating means 22 and a pump or circulator 23 also connected together by appropriate piping. The load takes the form of a heat exchanger 24 which has one end connected to the load supply port 16 and the other end connected to the load return port 17. The function of the valve is to selectively supply one of the conditioning fluids to the heat exchanger while bypassing the other directly to its return port or, when neither heating or cooling is required, to provide a full bypass wherein neither fluid is passed to the heat exchanger.

Slidably disposed in passage 11 is a generally cylindrical spool or slide valve member 25. Valve member 25 includes lands 26, 27 and 28 and adjacent each of these lands are annular spaces defined by portions of reduced cross section. These include a space 30 at the upper end of the valve member, a space 31 between lands 26 and 27 and a space 32 between lands 27 and 28. Valve member 25 is slidable longitudinally in passage 11. Its upper extreme position is determined by the abutment of the upper end of the valve member with a stop 33 which forms a part of a conventional stuffing box arrangement 34 at the upper end of the valve. The other extreme position is defined by the abutment of an adjustable member 35 with the closed lower end of valve body 10. As can be seen in FIGURE 1, member 35 is threaded into an opening in the lower end of valve member 25 and its extension, and thereby the extreme lower position of valve member 25 is preselected by threading the member more or less into the opening. Once adjusted it is locked in place by a lock nut 36. A valve stem 37 is attached to the upper end of slide valve 25 by appropriate means and extends outwardly through stuffing box 34 to a position where it is operably connected to an actuating means (not shown).

Land 26 of the valve member is disposed adjacent to, and cooperates with, ports 12, 13 and 16. It is constructed so that fluid communication between supply port 12 and inlet 18a to bypass 18 is always open. Land 27 is disposed adjacent to, and cooperates with, ports 14 and 17 while land 28 cooperates with ports 15 and 17 and also with opening 18b of passage 18. As will be seen hereinafter, in one extreme position of valve member 25, land 28 interrupts fluid communication between passage 18 and port 15. Land 26 is provided with characterizing control contours 26a and 26b at its upper and lower ends, respectively. Lands 27 and 28 are provided with characterizing control contours 27a and 28a, respectively. The function of these contours will be explained hereinafter.

FIGURE 1 discloses the valve with slide valve member 25 disposed in its upper extreme position wherein its upper end abuts stop 33. In this position, land 26 blocks fluid communication between supply port 12 and load supply port 16. However, a passage is provided through space 30 from supply port 12 to opening 18a of bypass passage 18. Land 28 blocks fluid communication between return port 15 and load return port 17 but the port 18b of the bypass passage is open to return 15. Therefore, the cooling fluid is bypassed directly through passage 18 to its return. Thus, the cooling fluid can continue to circulate but does not reach the heat exchanger. In this position of valve 25, fluid communication is established between the second supply port 13 and load supply port 16 by way of space 31. Thus, the heating fluid flows to the heat exchanger 24. Land 27 blocks fluid communication between supply port 13 and return port 14 but communication is established between load supply port 17 and return port 14 by way of space 32. Thus, the heating fluid flows through the heat exchanger and then back through the return port 14 to the heating means and the pump. If valve 25 is moved downwardly from the position disclosed in FIGURE 1, control contour 26b gradually decreases the size of the flow passage between heating fluid supply port 13 and load port 16 and at the same time land 27 moves downwardly so that an opening occurs along contour 27a to allow a portion of the heating fluid to bypass directly to return port 14. Thus, by movement of valve member 25 downwardly, the flow of heating fluid through the heat exchanger may be modulated but the total amount of heating fluid circulated by the pump remains substantially constant. This is accomplished by selecting a proper shape for control contours 26b and 27a. It should be noted that the initial size of the opening between port 18b and return port 15 is great enough so that this downward movement of valve member 25 does not substantially affect the flow of cooling fluid through bypass passage 18 to return port 15.

When valve member 25 has been moved downwardly to a position about midway between its two end positions it occupies the position disclosed in FIGURE 2. In this position land 26 completely blocks flow between heating fluid supply port 13 and load supply port 16. At the same time, land 27 blocks communication between load return port 17 and heating fluid return port 14. At this time the entire amount of heating fluid flows directly from supply port 13 to return port 14. It should be noted that space 31, between lands 26 and 27, includes a portion 31a which is reduced in diameter from the size of lands 26 and 27 but is larger in diameter than the portion of the valve immediately adjacent contour surface 26b. This portion 31a provides a flow restriction which, when member 25 is in its intermediate position as shown in FIGURE 2, offers a resistance to fluid flow which is approximately equal to the resistance offered by the heat exchanger. Thus, the total amount of heating fluid circulating through the system is approximately equal regardless of the position of valve member 25 as is the resistance to flow of the system. In this intermediate position the cooling fluid continues to flow from supply port 12 through bypass 18 to return port 15. Communication between bypass 18 and return port 15 remains substantially unaffected by contour portion 28a of land 28. At this point it should be noted that ports 18a and 18b are of a smaller diameter than the actual passage 18 (see FIGURE 4). This is done so that the passage offers a certain amount of restriction to fluid flow, and, similarly to the function of portion 31a of valve member 25, is chosen such that the resistance to fluid flow is substantially the same as that provided by the heat exchanger if the entire amount of cooling fluid was circulated through the exchanger rather than through the bypass.

If valve member 25 is moved downward from the position disclosed in FIGURE 2, land 26 gradually moves away from its position wherein it blocks communication to load supply port 16 and gradually cooling fluid flows from supply port 12 through space 30, past control contour 26a to load supply port 16. At the same time, land 28 moves downward to partially open communication between load return port 17 and cooling fluid return port 15, and control contour portion 28a gradually blocks off communication between bypass passage 18 and return port 15. Thus, a portion of the cooling fluid begins to flow through the heat exchanger and another portion is bypassed. During this time the entire amount of heating fluid is bypassed directly to its return 14. Ultimately valve member 25 reaches its lowermost end position as disclosed in FIGURE 3. In this position bypass 18 is completely closed off and full flow of cooling fluid is provided to the heat exchanger. At the same time the total flow of heating fluid is bypassed directly to its return.

It should be noted that in each of the positions of valve 25 which have been described, there is no mixing, or substantially no mixing, of the heating and cooling fluids. A substantially constant quantity of each of the fluids is continuously circulated through the valve, regardless of the position of valve member 25. Thus, should the need arise that the valve be quickly changed from a heating to a cooling position, or vice versa, the necessary fluid is immediately available at the proper temperature. If the bypass arrangement was not provided, those fluids in the pipe lines might be at a substantially different temperature and a substantial time lag occur before the proper temperature were reached.

The valve has been disclosed in FIGURES 1 through 5 with the various ports lying in a single plane and the bypass passage provided in a perpendicular plane. It will be obvious that, for the sake of convenience in connecting the associated piping, these ports may be rotated to various positions around the periphery of the valve. It is only essential that each port be longitudinally spaced from all of the others.

Figure 6:
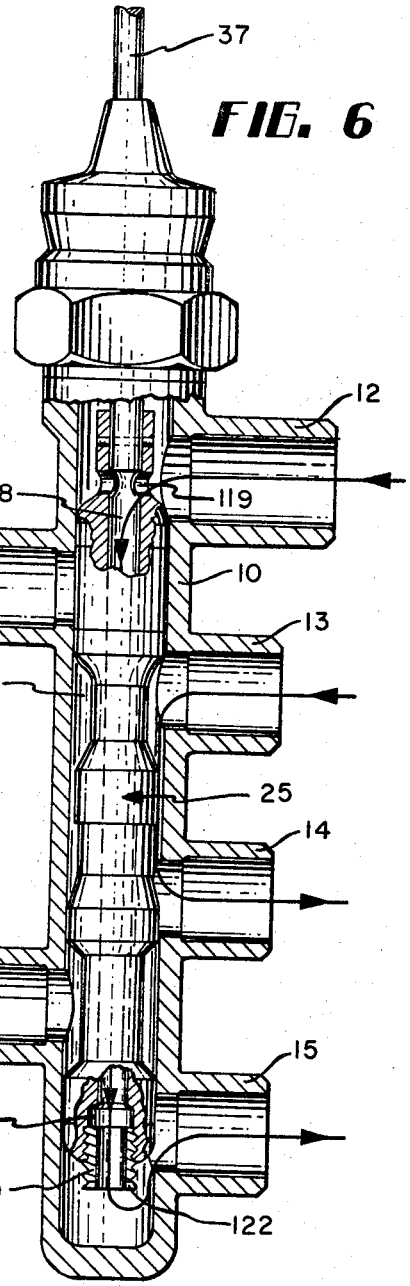
FIGURE 6 is a longitudinal cross sectional view generally similar to FIGURE 2 but disclosing a modified form of the valve.

Another embodiment of our invention is disclosed in FIGURE 6. The valve body is substantially identical to that disclosed in FIGURES 1 through 5 except that the bypass 18 and the associated ports 18a and 18b have been eliminated. Identical parts in FIGURE 6 will be identified by using the same numbers as used in FIGURES 1 through 5. In the embodiment of FIGURE 6 the bypass from cooling fluid port 12 to return port 15 is by way of an axial bore or longitudinal passage 118 extending through the center of valve member 25. At the upper end, this passage is blocked by a portion of valve stem 37 which extends thereinto. However, communication with passage 118 is provided through a cross bore 119 which thus provides an inlet opening on each side. At the lower end of valve member 25, a threaded piece of tubing 120 may be threaded into an enlarged threaded opening 121 which is concentric with opening 118. This piece of tubing may be threaded more or less into valve member 25 and thus determine the lowermost position of member 25 in valve body 10 as did member 35 disclosed in FIGURE 1. If desired, tubing 120 may be provided with a transverse slot 122 at its lower end so that it may be adjusted with a screwdriver when valve member 25 is removed from body 10.

The operation of this embodiment of the invention is identical to that of the structure described above in connection with FIGURES 1 through 5. FIGURE 6 discloses valve member 25 in its intermediate position wherein flow to the heat exchanger is completely blocked by land 26 and both the heating and cooling fluids are on full bypass. One advantage of this form of the invention is that cooling fluid flowing through the center of valve member 25 tends to cool it and this aids in preventing deformation of the seats and conducting surfaces of the valve due to high temperatures resulting from the flow of heating fluid through the valve.

Various modifications to our invention may become apparent to those skilled in the art in view of our disclosure herein. Therefore, it should be understood that the two embodiments described above are by way of illustration only and our invention should be limited solely by the scope of the appended claims.

The embodiments of the invention in which an exclusive property or right is claimed are defined as follows:

1. A multiport valve, especially for selectively and controllably connecting a heating medium circuit and a cooling medium circuit to a heat exchanger, the valve comprising:

a body having a longitudinally extending passage therein, first and second supply ports, first and second return ports, a load supply port and a load return port in said body, each of said ports communicating with said passage and each being adapted for connection to an external conduit, each of said ports being disposed in said body in longitudinally spaced relationship with each of said other ports therein;

means defining a bypass flow passage from said first inlet port to said first outlet port;

a slide valve member slidably disposed in said passage and longitudinally movable therein between two end positions for controlling fluid flow between adjacent ones of said ports and through said bypass passage, said valve member including a plurality of longitudinally spaced lands and a plurality of spaces defined by areas of reduced cross section adjacent each of said lands;

said valve member being so constructed and said ports being so disposed that when said valve member is disposed in an intermediate position, between said end positions, said valve member blocks flow from each of said supply ports to said load supply port and, by one of said spaces, establishes fluid communication through said bypass flow passage and, by another of said spaces, connects said second supply port to said second return port; when said valve member is in one of said end positions, it connects said first supply port to said load supply port through one of said spaces, connects said load return port to said first return port through a second of said spaces, connects said second supply port to said second return port through a third of said spaces and, by one of said lands, blocks flow to said bypass passage; and when said valve member is in the other of its end positions, it connects said second supply port to said load supply port through one of said spaces, connects said load return port to said second return port through a second of said spaces, and establishes communication through said bypass flow passage through a third of said spaces.

2. The multiport valve of claim 1 wherein the longitudinally extending passage in the valve body is cylindrical; wherein the slide valve member is cylindrical with a diameter substantially the same as the diameter of said passage; and wherein the spaces on said slide valve member are annular.

3. The multiport valve of claim 1 wherein said second inlet and said second outlet ports are disposed between said first inlet and said first outlet ports, and wherein said load supply port is disposed between said first and second inlet ports and said load return port is disposed between said first and second outlet ports.

4. The multiport valve of claim 3 wherein said slide valve member includes at least three longitudinally spaced lands; wherein a first of said lands is disposed adjacent to and is cooperable with said first and second supply ports and said load supply port to control communication between said first supply port and said load supply port, between said second supply port and said load supply port, and between said second supply port and said second return port; wherein a second of said lands is disposed adjacent to and is cooperable with said second return port and said load return port to control communication between said load return port and said second return port, and between said second supply port and said second return port; and wherein the third of said lands is disposed adjacent to and is cooperable with said load return port and said first return port to control communication between said load return port and said first return port and between said first return port and said bypass passage.

5. The multiport valve of claim 4 wherein said bypass passage and the space between said first and second lands each include means providing a flow restriction approximately equal to the flow restriction provided by a heat exchanger.

6. The multiport valve of claim 4 wherein said first land has a characterizing control contour at each longitudinal end thereof, one of said contours being disposed for characterizing fluid flow from said first supply port to said load supply port, and the other of said contours being disposed for characterizing fluid flow from said second supply port to said load supply port and to said second return port.

7. The multiport valve of claim 1 wherein one end of said bypass passage is continuously in communication with said first supply port regardless of the longitudinal position of said slide valve member; and wherein communication between the other end of said bypass passage and said first return port is controlled by one of the lands on said slide valve member.

8. The multiport valve of claim 7 wherein said bypass passage includes a longitudinal flow passage in said slide valve member and extending substantially from one end thereof to the other.

9. The multiport valve of claim 7 wherein said bypass passage comprises fluid passage means external of said valve body and communicating with the longitudinally extending passage in said body adjacent said first supply port and adjacent said first return port.

References Cited
UNITED STATES PATENTS 2,351,140   6/1944   McCloy _____ 137—625.29 X

FOREIGN PATENTS 644,212   10/1950   Great Britain.

ARNOLD ROSENTHAL, *Primary Examiner.*